(12) United States Patent
Abe

(10) Patent No.: US 12,535,649 B2
(45) Date of Patent: Jan. 27, 2026

(54) OBJECTIVE

(71) Applicant: Evident Corporation, Nagano (JP)

(72) Inventor: Kenichiro Abe, Nagano (JP)

(73) Assignee: Evident Corporation, Nagano (JP)

( * ) Notice: Subject to any disclaimer, the term of this patent is extended or adjusted under 35 U.S.C. 154(b) by 490 days.

(21) Appl. No.: 18/075,102

(22) Filed: Dec. 5, 2022

(65) Prior Publication Data

US 2023/0185054 A1    Jun. 15, 2023

(30) Foreign Application Priority Data

Dec. 10, 2021    (JP) .................. 2021-200482

(51) Int. Cl.
*G02B 9/10*    (2006.01)
(52) U.S. Cl.
CPC ..................... *G02B 9/10* (2013.01)
(58) Field of Classification Search
CPC ............. G02B 9/10; G02B 9/64; G02B 21/02
See application file for complete search history.

(56) References Cited

U.S. PATENT DOCUMENTS

| | | | |
|---|---|---|---|
| 5,739,958 A | 4/1998 | Abe | |
| 2012/0113524 A1 | 5/2012 | Kasahara et al. | |
| 2016/0349495 A1 | 12/2016 | Pretorius | |
| 2017/0184830 A1 | 6/2017 | Akahane | |
| 2018/0113293 A1 | 4/2018 | Abe et al. | |

FOREIGN PATENT DOCUMENTS

| | | |
|---|---|---|
| JP | S60241009 A | 11/1985 |
| JP | H0350517 A | 3/1991 |
| JP | H08114747 A | 5/1996 |
| JP | 2007328014 A | 12/2007 |
| JP | 2012118509 A | 6/2012 |
| JP | 2016537670 A | 12/2016 |
| JP | 2017116845 A | 6/2017 |
| JP | 2019191555 A | 10/2019 |

OTHER PUBLICATIONS

Chinese Office Action (and an English language translation thereof) dated Sep. 13, 2025, issued in counterpart Chinese Application No. 202211563014.5.
Japanese Office Action (and an English language translation thereof) dated Sep. 30, 2025, issued in counterpart Japanese Application No. 2021-200482.

*Primary Examiner* — Jack Dinh
(74) *Attorney, Agent, or Firm* — Holtz, Holtz & Volek PC

(57) ABSTRACT

The objective includes a first lens group having positive power and a second lens group having negative power and including a pair of meniscus lens components having concave surfaces facing each other. The first lens group includes a first lens situated closest to an object side and has positive power with a concave surface facing the object side. The objective includes three or more cemented lenses arranged closer to the object side than the pair of meniscus lens components, and satisfies the following conditional expressions.

$$2.6 \leq \varphi_{L1}/D_{L1} \leq 16 \tag{1}$$

$$0.1 \leq |R_{212}|/f \leq 3.5 \tag{2}$$

Here, $\varphi_{L1}$ and $D_{L1}$ are an outer diameter and a thickness of the first lens. $R_{212}$ is a radius of curvature of a surface closest to the image side in a first meniscus lens component among the pair of meniscus lens components. f is a focal length of the objective.

14 Claims, 9 Drawing Sheets

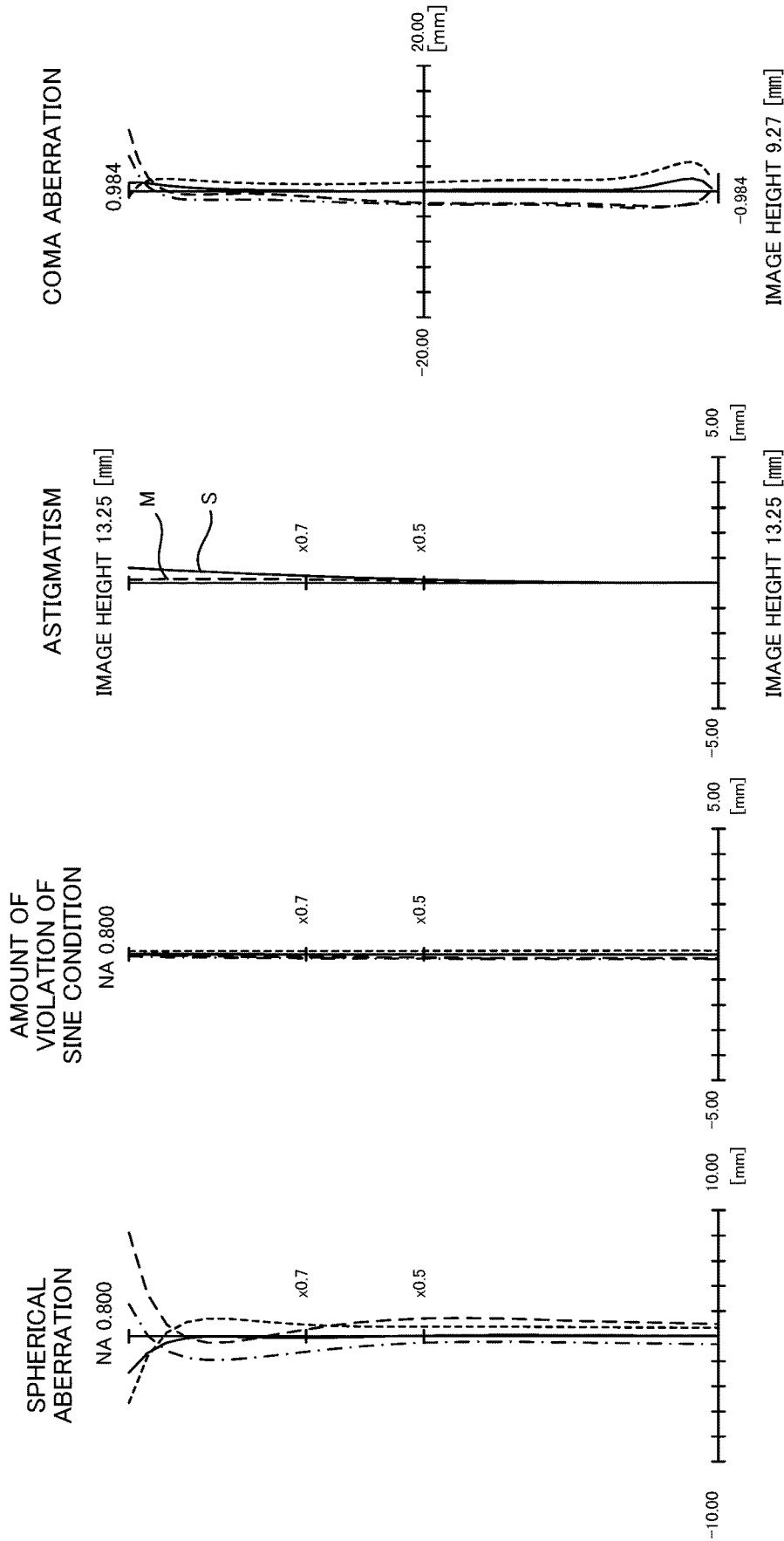

OBJECTIVE

CROSS REFERENCE TO RELATED APPLICATIONS

This application is based upon and claims the benefit of priority from prior Japanese Patent Application No. 2021-200482, filed Dec. 10, 2021, the entire contents of which are incorporated herein by this reference.

TECHNICAL FIELD

The disclosure herein relates to an objective.

BACKGROUND

Objectives used in industrial applications such as wafer inspection are required to have a high numerical aperture (hereinafter, referred to as NA) in order to achieve a high resolution. Further, in order to achieve high throughput, the objectives are also required to have a wide field of view and a long working distance (hereinafter, referred to as WD) for improving the transport speed while preventing the risk of collision between a subject and the objective.

SUMMARY

An objective according to one aspect of the present invention includes a first lens group that has positive refractive power and converts divergent light from an object point to convergent light, and a second lens group that has negative refractive power and is arranged closer to an image side than the first lens group. The first lens group includes a first lens that is a meniscus lens that is situated closest to an object side and has positive refractive power with a concave surface facing the object side. The second lens group includes a pair of meniscus lens components having concave surfaces facing each other. The objective includes three or more cemented lenses that are arranged closer to the object side than the pair of meniscus lens components. The objective satisfies the following conditional expressions.

$$2.6 \leq \varphi_{L1}/D_{L1} \leq 16 \quad (1)$$

$$0.1 \leq |R_{212}|/f \leq 3.5 \quad (2)$$

Here, $\varphi_{L1}$ is an outer diameter of the first lens. $D_{L1}$ is a thickness of the first lens on an optical axis. $R_{212}$ is a radius of curvature of a surface closest to the image side in a first meniscus lens component that is a meniscus lens component situated on the object side among the pair of meniscus lens components. f is a focal length of the objective.

BRIEF DESCRIPTION OF DRAWINGS

The present invention will be more apparent from the following detailed description when the accompanying drawings are referenced.

FIGS. 9A to 9D are diagrams of aberrations in an optical system including the objective and the tube lens.

DESCRIPTION OF EMBODIMENTS

Figure 1:
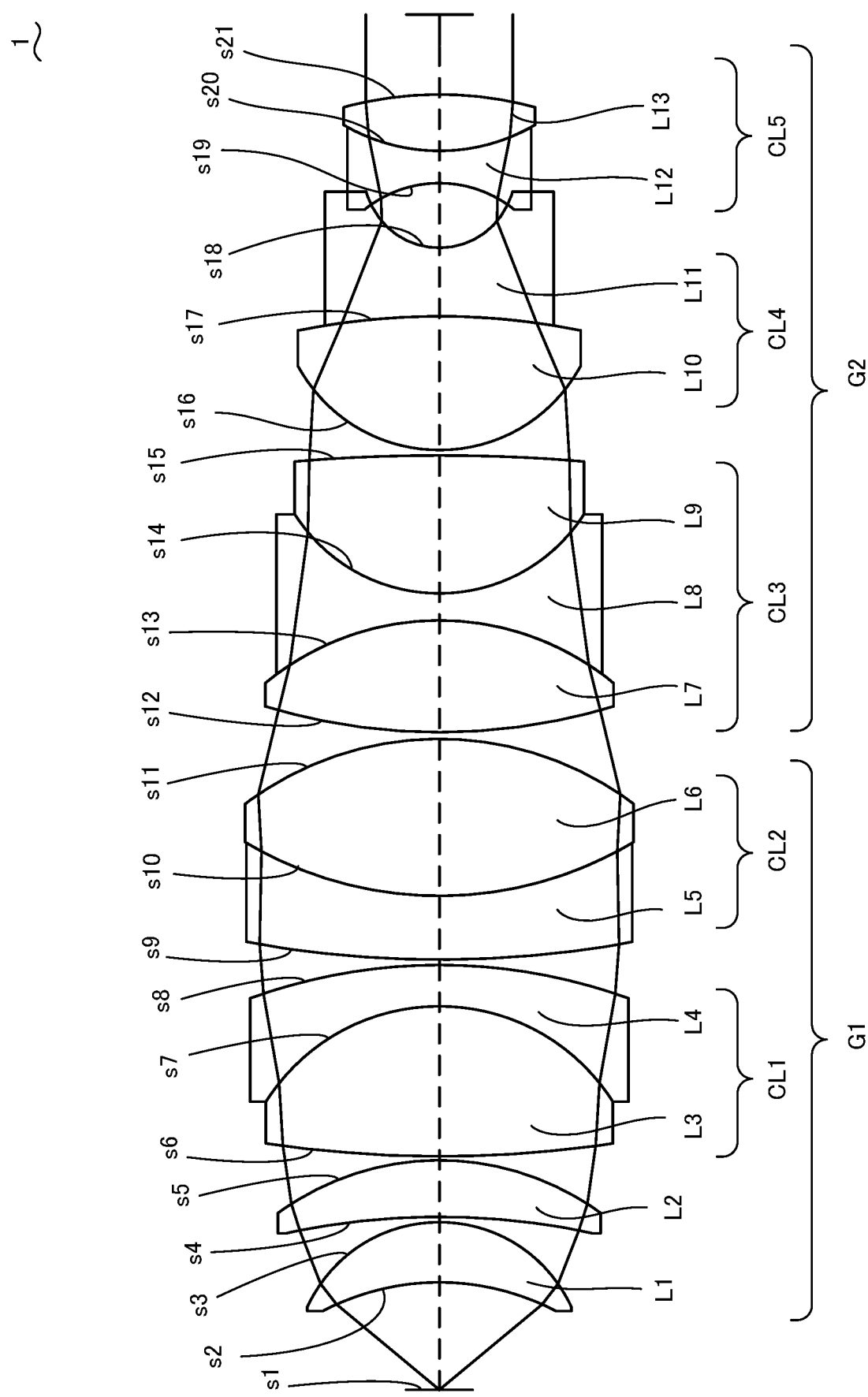
FIG. 1 is a cross-sectional view of an objective according to a first example of the present invention.

For example, JP S60-241009 A discloses an objective having an NA of 0.8 or more at 100×, and such an objective has an excessively small actual field of view, and thus it is difficult to obtain sufficient throughput. Further, if a wide field of view is achieved with the configuration of the objective, mainly, favorable correction to a field curvature is difficult. This makes it difficult to achieve a good resolution to the periphery of a wide field of view.

An objective according to an embodiment of the present application will be described. The objective according to the present embodiment (hereinafter, simply referred to as an objective) is an infinity-corrected microscope objective used in combination with a tube lens.

The objective includes a first lens group that has positive refractive power and converts divergent light from an object point to convergent light, and a second lens group that has negative refractive power and is arranged closer to an image side than the first lens group. A lens component, in the first lens group, closest to the image side is a lens component that is closest to an object side and plays a role in converting the divergent light from the object point to the convergent light and emitting the convergent light. Stated differently, in a case where the objective has a plurality of lens surfaces that emits the convergent light, a lens surface closest to the object side among the lens surfaces is a lens surface, in the first lens group, closest to the image side. A boundary between the first lens group and the second lens group can be identified by the characteristics described above.

In the present specification, the lens component refers to a lens block in which only two surfaces, i.e., a surface on the object side and a surface on the image side, from among lens surfaces through which a light ray from an object point passes have contact with air regardless of whether the lens is a single lens or a cemented lens. That is, one single lens is one lens component, and one cemented lens is also one lens component. On the other hand, a plurality of single lenses and a plurality of cemented lenses arranged via air are not referred to as one lens component herein.

The first lens group converts divergent light from an object point to convergent light and causes the convergent light to enter the second lens group. The second lens group converts the convergent light from the first lens group to parallel light. The first lens group once converts the divergent light from the object point to the convergent light and causes the convergent light to enter the second lens group, so that the height of a marginal ray in the second lens group can be made smaller than the height of a marginal ray in the first lens group. Thus, the Petzval sum can be effectively corrected in the second lens group having negative refractive power, and as a result, a field curvature can be favorably corrected in a wide field of view.

The first lens group includes a meniscus lens (hereinafter, also referred to as a first lens) situated closest to the object side, and the meniscus lens has positive refractive power with a concave surface facing the object side. In order to achieve an objective with a high NA and a long WD, the height of a marginal ray at the time of incidence on the objective inevitably increases due to divergence of light before entering the objective. It is thus necessary to situate a lens having positive refractive power closest to the object side to reduce the divergence of a pencil of light. At this time, if the lens having positive refractive power situated closest to the object side is a meniscus lens having a concave surface facing the object side, then an effect of reducing a spherical aberration and a coma aberration mainly to a small extent can be obtained. In the case of an objective with a particularly long WD as in examples described later, the height of a marginal ray at the time of incidence is very high; therefore, unless the lens as described above is arranged, it is difficult to correct an aberration favorably in the entire optical system. Thus, a meniscus lens having positive refractive power with a concave surface facing the object side is situated closest to the object side in the objective.

The second lens group includes a pair of meniscus lens components whose concave surfaces face each other. The second lens group on which convergent light is incident includes the pair of meniscus lens components, which is a gauss group with a convex outer surface and a concave inner surface, so that it is possible to reduce the height of a marginal ray in the concave surfaces facing each other. Consequently, the Petzval sum can be effectively corrected in the concave surface having negative refractive power, which enables the field curvature to be satisfactorily reduced.

The objective includes three or more cemented lenses situated closer to the object side than the pair of meniscus lens components. The objective includes three or more cemented lenses in which lenses having different optical characteristics are cemented, which enables a chromatic aberration to be sufficiently corrected. In particular, a cemented lens including a positive lens with a low dispersivity and a negative lens with a high dispersivity has an effect of correcting an axial chromatic aberration generally called an achromatic effect. Three or more cemented lenses having an achromatic effect are situated in a region closer to the object side than a pair of meniscus lens components having a region where the height of a marginal ray is large, so that a good axial chromatic aberration correction effect can be obtained.

The objective is configured to satisfy the following conditional expressions (1) and (2).

$$2.6 \le \varphi_{L1}/D_{L1} \le 16 \quad (1)$$

$$0.1 \le |R_{212}|/f \le 3.5 \quad (2)$$

Here, $\varphi_{L1}$ is an outer diameter of the first lens. $D_{L1}$ is a thickness of the first lens on an optical axis. $R_{212}$ is a radius of curvature of a surface closest to the image side in a meniscus lens component which is situated on the object side (hereinafter, also referred to as a first meniscus lens component) among the pair of meniscus lens components. f is a focal length of the objective. Note that the outer diameter of the first lens is usually about 0.5 mm larger than an effective diameter (diameter) of the surface on the image side of the first lens.

The conditional expression (1) is a conditional expression that is used to favorably correct mainly the spherical aberration and the coma aberration in an objective with a long WD. It is impossible to greatly reduce the divergence of the divergent light that enters at a large height of a marginal ray due to the influence of the long WD on the concave surface on the object side of the first lens; however, mainly, the spherical aberration and the coma aberration can be favorably corrected by satisfying the conditional expression (1).

In a case where $\varphi_{L1}/D_{L1}$ is less than the lower limit (2.6), the thickness of the first lens becomes too large, which excessively increases the height of the marginal ray in the first lens. Thus, the height of the marginal ray incident on the surface on the image side of the first lens and the subsequent optical system becomes too large, which makes it difficult to reduce the occurrence of the spherical aberration and the coma aberration. This makes it difficult to favorably correct an aberration in the entire optical system. On the other hand, in a case where $\varphi_{L1}/D_{L1}$ exceeds the upper limit (16), the thickness of the first lens becomes too small with respect to the outer diameter thereof, which makes it difficult to secure the stiffness of the first lens. This increases a manufacturing error in the surface shape, which makes it difficult to desirably correct an aberration.

The conditional expression (2) is a conditional expression that is used to favorably correct the field curvature mainly. Since the Petzval sum can be appropriately corrected in the first meniscus lens component with a concave surface facing the image side by satisfying the conditional expression (2), the field curvature can be favorably corrected in the entire optical system.

In a case where $|R_{212}|/f$ exceeds the upper limit (3.5), the radius of curvature of the concave surface of the first meniscus lens becomes too large, so that the Petzval sum cannot be sufficiently corrected, which makes it difficult to favorably correct the field curvature in the entire optical system. In particular, in an optical system having a long WD, the height of a marginal ray at the time of incidence is inevitably large, and thus, in a portion of a region relatively close to an object such as the first lens group included in the optical system, it is difficult to situate a strong concave surface which serves to increase the ray height and also difficult to correct the Petzval sum. Therefore, in order to achieve sufficient aberration correction in a wide field of view with a long WD, it is necessary to sufficiently correct the Petzval sum in the first meniscus lens. On the other hand, in a case where $|R_{212}|/f$ is less than the lower limit (0.1), the Petzval sum is excessively corrected in the first meniscus lens. It is thus difficult to favorably correct the field curvature in the entire optical system.

According to the objective configured as described above, it is possible to satisfy the specifications of a long WD and a wide field of view and to favorably correct the aberration to the periphery of the field of view.

Note that the objective may be configured to satisfy the following conditional expression (1-1) or the conditional expression (1-2) instead of the conditional expression (1). The objective may be configured to satisfy the following conditional expression (2-1) or the conditional expression (2-2) instead of the conditional expression (2).

$$3.3 \le \varphi_{L1}/D_{L1} \le 12 \quad (1\text{-}1)$$

$$3.8 \le \varphi_{L1}/D_{L1} \le 8 \quad (1\text{-}2)$$

$$0.2 \le |R_{212}|/f \le 1.7 \quad (2\text{-}1)$$

$$0.3 \le |R_{212}|/f \le 1.2 \quad (2\text{-}2)$$

A desirable configuration of the objective will be described below.

The second lens group desirably includes a positive-negative-positive three-piece cemented lens in which positive lenses are arranged on both sides of one negative lens. An achromatic lens component including the three-piece cemented lens is provided, which makes it possible to effectively correct the axial chromatic aberration while effectively using a space in the objective. Further, in order for the lens component having an achromatic effect to exhibit a sufficient effect, it is desirable that the lens component is arranged in a region having a large height of a marginal ray; which inevitably increases the lens diameter in such a region. As described above, the use of the achromatic lens component including the three-piece cemented lens makes it possible to maintain the stiffness of the lens component strong even if the lens diameter is increased.

Each of the pair of meniscus lens components is desirably a cemented lens. As described above, the pair of meniscus lens components mainly have a function of reducing the Petzval sum to correct the field curvature, and using the pair of meniscus lens components as a cemented lens enables the lens to have a function of correcting a chromatic aberration in addition to the field curvature. It is thus possible to favorably correct the axial chromatic aberration mainly.

The objective desirably satisfies at least one of the following conditional expressions (3) to (5).

$$0.5 \leq |R_{211}|/f \leq 7 \tag{3}$$

$$18 \leq vdL \leq 31 \tag{4}$$

$$1.51 \leq ndH \leq 1.75 \tag{5}$$

Here, $R_{211}$ is a radius of curvature of a surface that is situated closest to the object side in the first meniscus lens component. vdL is the minimum value of Abbe numbers of positive lenses arranged closer to the image side than the surface that is situated closest to the image side in the first meniscus lens component. ndH is the maximum value of refractive indices of negative lenses included in the objective.

Conditional expression (3) is a conditional expression that is used to further favorably correct the field curvature mainly. As described above, the first meniscus lens component having a convex surface facing the object side has a correction effect of the Petzval sum and, in order to obtain a sufficient correction effect, it is desirable to make the height of a marginal ray in a concave surface on the image side of the first meniscus lens component sufficiently small.

In a case where $|R_{211}|/f$ does not exceed the upper limit (7), it is possible to prevent the radius of curvature of the convex surface on the object side of the first meniscus lens component from becoming too large. As a result, the incident light is converged on the convex surface, and the height of the marginal ray on the concave surface on the image side can be reduced sufficiently, so that the field curvature can be corrected favorably. Further, in a case where $|R_{211}|/f$ does not fall below the lower limit (0.5), it is possible to prevent the radius of curvature of the convex surface on the object side of the first meniscus lens component from becoming too small. As a result, it is possible to prevent various aberrations such as a coma aberration on the convex surface from occurring frequently, and to favorably correct aberrations.

The conditional expression (4) is a conditional expression that is used to favorably correct an axial chromatic aberration and a lateral chromatic aberration mainly. Since the principal ray of off-axis light of the objective intersects the optical axis in the objective, the sign of the off-axis principal ray height is reversed between a region on the object side and a region on the image side at the intersection. In such a configuration, it is possible to effectively correct the lateral chromatic aberration generated in the region on the object side by using a highly dispersed glass material for the positive lens arranged in the region on the image side with respect to the intersection described above.

In a case where vdL does not exceed the upper limit (31), the lateral chromatic aberration in the objective can be favorably corrected by the function described above. Further, in a case where vdL does not fall below the lower limit (18), the occurrence of axial chromatic aberration can be prevented from becoming too large, and the axial chromatic aberration can be corrected favorably in the entire objective.

The conditional expression (5) is a conditional expression that is used to favorably correct a wave aberration such as a spherical aberration. In order for the lens to have negative refractive power, it is necessary to make at least one surface concave, and the thickness of the center of the lens is generally thinner than the periphery thereof. Such a lens shape easily causes a surface shape error during manufacturing.

In a case where ndH does not exceed the upper limit (1.75), the refractive index of the negative lens does not become too large, and the influence of the lens surface shape error on the wave aberration can be reduced. This results in favorably correcting the wave aberration such as the spherical aberration. In general, a glass material having a low refractive index tends to have a low dispersivity. Therefore, in a case where ndH does not fall below the lower limit (1.51), the dispersion of the negative lens does not become too small, and the chromatic aberration can be corrected favorably.

Note that the objective may be configured to satisfy the following conditional expression (3-1) or conditional expression (3-2) instead of the conditional expression (3). The objective may be configured to satisfy the following conditional expression (4-1) or conditional expression (4-2) instead of the conditional expression (4). The objective may be configured to satisfy the following conditional expression (5-1) or conditional expression (5-2) instead of the conditional expression (5).

$$0.8 \leq |R_{211}|/f \leq 4 \tag{3-1}$$

$$1.2 \leq |R_{211}|/f \leq 2.5 \tag{3-2}$$

$$20 \leq vdL \leq 30 \tag{4-1}$$

$$24 \leq vdL \leq 29 \tag{4-2}$$

$$1.55 \leq ndH \leq 1.71 \tag{5-1}$$

$$1.61 \leq ndH \leq 1.66 \tag{5-2}$$

The objective configured as described above has a medium magnification, more specifically a magnification of 60× or less. In other words, if the focal length of the objective is f and the focal length of the tube lens used in combination with the objective is ft, the relationship ft/f≤60 is established.

Further, the objective configured as described above realizes a high NA and a long WD while having a compact configuration. More specifically, the following conditional expressions are satisfied.

$$0.065 \leq d0/L \leq 0.3 \tag{6}$$

$$NA \geq 0.75 \tag{7}$$

$$40 \text{ mm} \leq L \leq 75 \text{ mm} \tag{8}$$

Here, d0 denotes a distance on an optical axis between a sample surface and a surface of the objective that is situated closest to the object side. L denotes a distance on the optical axis between the sample surface and a surface of the objective that is situated closest to the image side. NA denotes a numerical aperture on the object side of the objective. That is, d0 is substantially equal to WD, and L is substantially equal to the sum of WD and the total length of the objective (more strictly, the total length of the optical system from the first lens group to the second lens group described later).

In particular, satisfying the conditional expression (6) achieves a long WD as well as a compact configuration. In a case where d0/L is less than the lower limit, WD is too short or the size of the objective is increased. On the other hand, in a case where d0/L exceeds the upper limit, the restriction on the number of lenses and the shape of the lens becomes too large, which makes correction to the aberration difficult.

Embodiments of the objective described above will be specifically described below.

First Example

FIG. 1 is a cross-sectional view of an objective 1 according to the present example. The objective 1 is a microscope objective, and includes a first lens group G1 that has positive refractive power and converts divergent light from an object point to convergent light, and a second lens group G2 that has negative refractive power and is arranged closer to an image side than the first lens group G1.

The first lens group G1 includes, in order from the object side, a lens L1 that is a meniscus lens having positive refractive power with a concave surface facing the object side, a lens L2 that is a meniscus lens with a concave surface facing the object side, a cemented lens CL1, and a cemented lens CL2.

The cemented lens CL1 is a two-piece cemented lens and includes, in order from the object side, a lens L3 that is a biconvex lens and a lens L4 that is a meniscus lens with a concave surface facing the object side. The cemented lens CL2 is a two-piece cemented lens and includes, in order from the object side, a lens L5 that is a meniscus lens with a concave surface facing the image side and a lens L6 that is a biconvex lens.

The second lens group G2 includes, in order from the object side, a cemented lens CL3, a cemented lens CL4, and a cemented lens CL5. The cemented lens CL4 and the cemented lens CL5 are a pair of meniscus lens components whose concave surfaces face each other. The objective 1 includes three cemented lenses (cemented lens CL1, cemented lens CL2, and cemented lens CL3) situated closer to the object side than the pair of meniscus lens components.

The cemented lens CL3 is a three-piece cemented lens and includes, in order from the object side, a lens L7 that is a biconvex lens, a lens L8 that is a biconcave lens, and a lens L9 that is a biconvex lens. That is, the cemented lens CL3 is a positive-negative-positive three-piece cemented lens in which positive lenses (lens L7, lens L9) are arranged on both sides of one negative lens (lens L8).

The cemented lens CL4 is a two-piece cemented lens and includes, in order from the object side, a lens L10 that is a biconvex lens and a lens L11 that is a biconcave lens. The cemented lens CL5 is a two-piece cemented lens and includes, in order from the object side, a lens L12 that is a biconcave lens and a lens L13 that is a biconvex lens.

Various data of the objective 1 are as follows. Note that $\beta$ is a magnification for a case where the objective 1 is combined with a tube lens 10. $NA_{ob}$ is a numerical aperture on the object side of the objective 1. f, f1, and f2 are a focal length of the objective, a focal length of the first lens group G1, and a focal length of the second lens group G2, respectively. The other parameters are as described above.

$NA_{ob}$=0.77, $\beta$=50, f=3.6 mm, f1=8.461 mm, f2=−17.921 mm, L=48.7 mm, d0=4.04 mm, $\varphi_{L1}$=9.44 mm, $D_{L1}$=2.262 mm, $R_{211}$=6.0569 mm, $R_{212}$=2.8444 mm, vdL=28.43, ndH=1.65412

Lens data of the objective 1 is as follows. Note that INF in the lens data represents infinity ($\infty$).

| Objective Lens 1 | | | | |
|---|---|---|---|---|
| s | r | d | nd | vd |
| 1 | INF | 4.040 | | |
| 2 | −9.4060 | 2.262 | 1.88300 | 40.76 |
| 3 | −5.4648 | 0.200 | | |
| 4 | −27.1526 | 2.125 | 1.56907 | 71.30 |
| 5 | −10.2529 | 0.150 | | |
| 6 | 44.3339 | 5.641 | 1.43875 | 94.66 |
| 7 | −7.7306 | 1.550 | 1.61340 | 44.27 |
| 8 | −20.8088 | 0.200 | | |
| 9 | 39.7597 | 2.398 | 1.65412 | 39.68 |
| 10 | 14.1869 | 5.904 | 1.43875 | 94.66 |
| 11 | −12.1348 | 0.250 | | |
| 12 | 22.5186 | 4.207 | 1.43875 | 94.66 |
| 13 | −10.2578 | 1.010 | 1.61340 | 44.27 |
| 14 | 6.4582 | 5.189 | 1.43875 | 94.66 |
| 15 | −65.9501 | 0.200 | | |
| 16 | 6.0569 | 5.033 | 1.56907 | 71.30 |
| 17 | −26.5773 | 2.570 | 1.65412 | 39.68 |
| 18 | 2.8444 | 2.437 | | |
| 19 | −4.4665 | 1.210 | 1.48749 | 70.23 |
| 20 | 7.1260 | 2.122 | 1.78880 | 28.43 |
| 21 | −13.6986 | 110.000 | | |

Here, s represents a surface number, r represents a radius of curvature (mm), d represents surface spacing (mm), nd represents a refractive index with respect to the d line, and vd represents an Abbe number. These symbols are also used in the following examples. A surface number s1 represents a sample surface. Surface numbers s2 and s21 represent a lens surface of the objective 1 that is situated closest to the object side and a lens surface of the objective 1 that is situated closest to the image side, respectively. For example, surface spacing d1 represents a distance on the optical axis between the surface represented by the surface number s1 and the surface represented by the surface number s2. Surface spacing d21 represents a distance (110 mm) on the optical axis between the surface represented by the surface number s21 and the tube lens.

The objective 1 satisfies the conditional expressions (1) to (8) as described below.

$$\varphi_{L1}/D_{L1}=4.173 \tag{1}$$

$$|R_{212}|/f=0.790 \tag{2}$$

$$|R_{211}|/f=1.682 \tag{3}$$

$$vdL=28.430 \text{(lens } L13) \tag{4}$$

$$ndH=1.654 \text{(lens } L5, \text{lens } L11) \tag{5}$$

$$d0/L=0.083 \tag{6}$$

$$NA=0.77 \tag{7}$$

$$L=48.7 \text{ mm} \tag{8}$$

Figure 2:
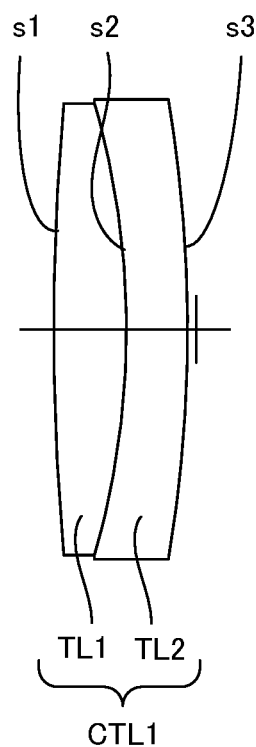
FIG. 2 is a cross-sectional view of a tube lens.

FIG. 2 is a cross-sectional view of the tube lens 10 used in combination with the objective 1. The tube lens 10 is a microscope tube lens that forms an enlarged image of an object in combination with an infinity-corrected objective.

The tube lens 10 is a cemented lens CTL1 including a lens TL1 that is a biconvex lens and a lens TL2 that is a meniscus lens arranged on an image side of the biconvex lens and having a concave surface facing the object side. The tube lens 10 is disposed such that the distance on the optical axis between the lens surface (surface number s21) closest to the image side of the objective 1 and the lens surface (surface number s1) closest to the object side of the tube lens 10 is 110 mm Note that the focal length of the tube lens 10 is 180 mm.

Lens data of the tube lens 10 is as follows.

| Imaging Lens 10 | | | | |
|---|---|---|---|---|
| s | r | d | nd | vd |
| 1 | 193.123 | 5.5 | 1.48749 | 70.23 |
| 2 | −61.238 | 4.6 | 1.72047 | 34.71 |
| 3 | −105.391 | | | |

Figure 3:
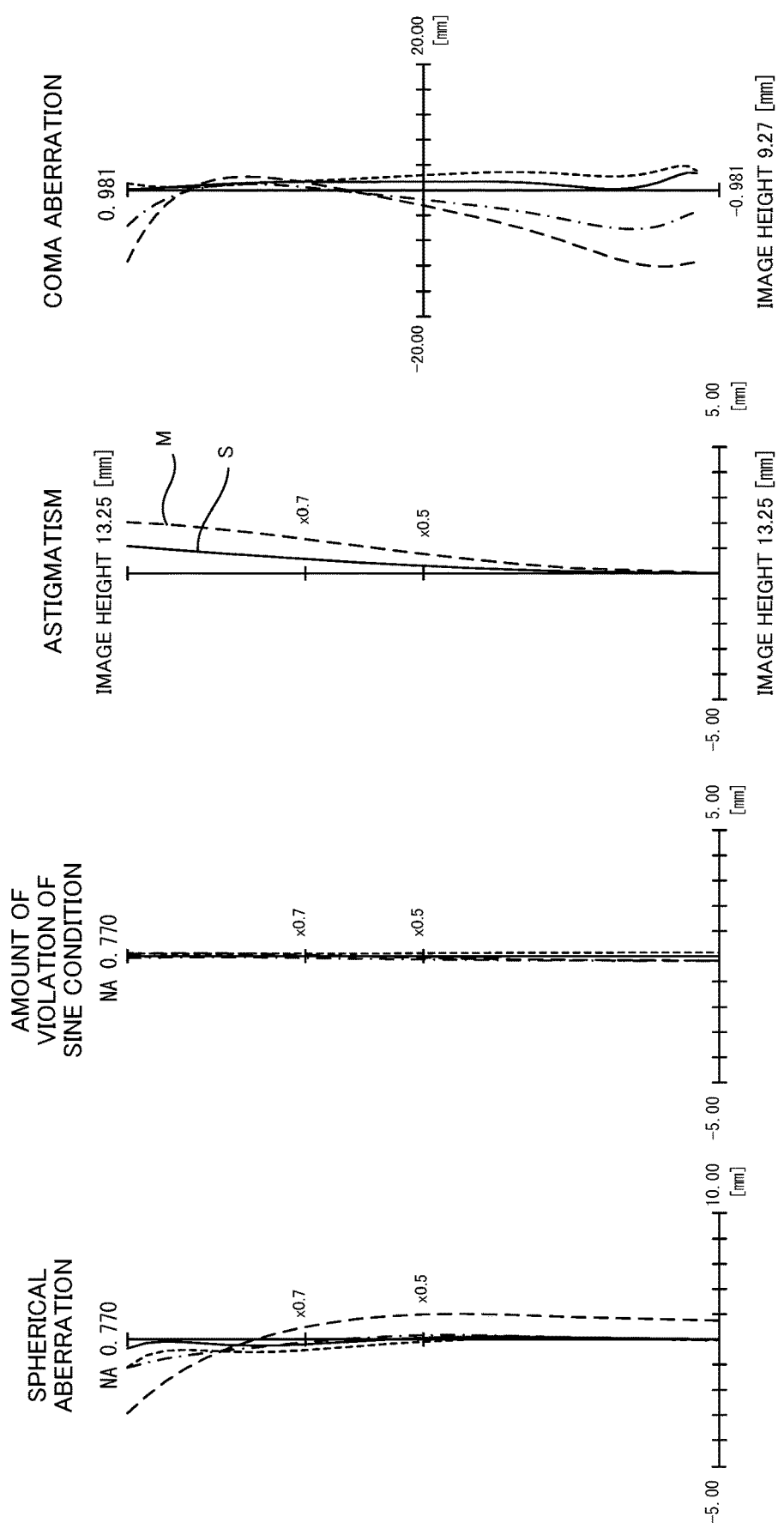
FIGS. 3A to 3D are diagrams of aberrations in an optical system including the objective and the tube lens.

FIGS. 3A to 3D are diagrams of aberrations in an optical system including the objective 1 and the tube lens 10, and illustrate aberrations on an image plane on which the objective 1 and the tube lens 10 form an optical image. FIG. 3A is a diagram of a spherical aberration. FIG. 3B is a diagram illustrating an amount of violation of the sine condition. FIG. 3C is a diagram of astigmatism. FIG. 3D is a diagram of a coma aberration at the level of 70% of an image height ratio (image height of 9.27 mm). In the diagrams, "M" represents a meridional component and "S" represents a sagittal component. As illustrated in FIGS. 3A to 3D, in the present embodiment, the aberrations are favorably corrected in a wide field of view.

Second Example

Figure 4:
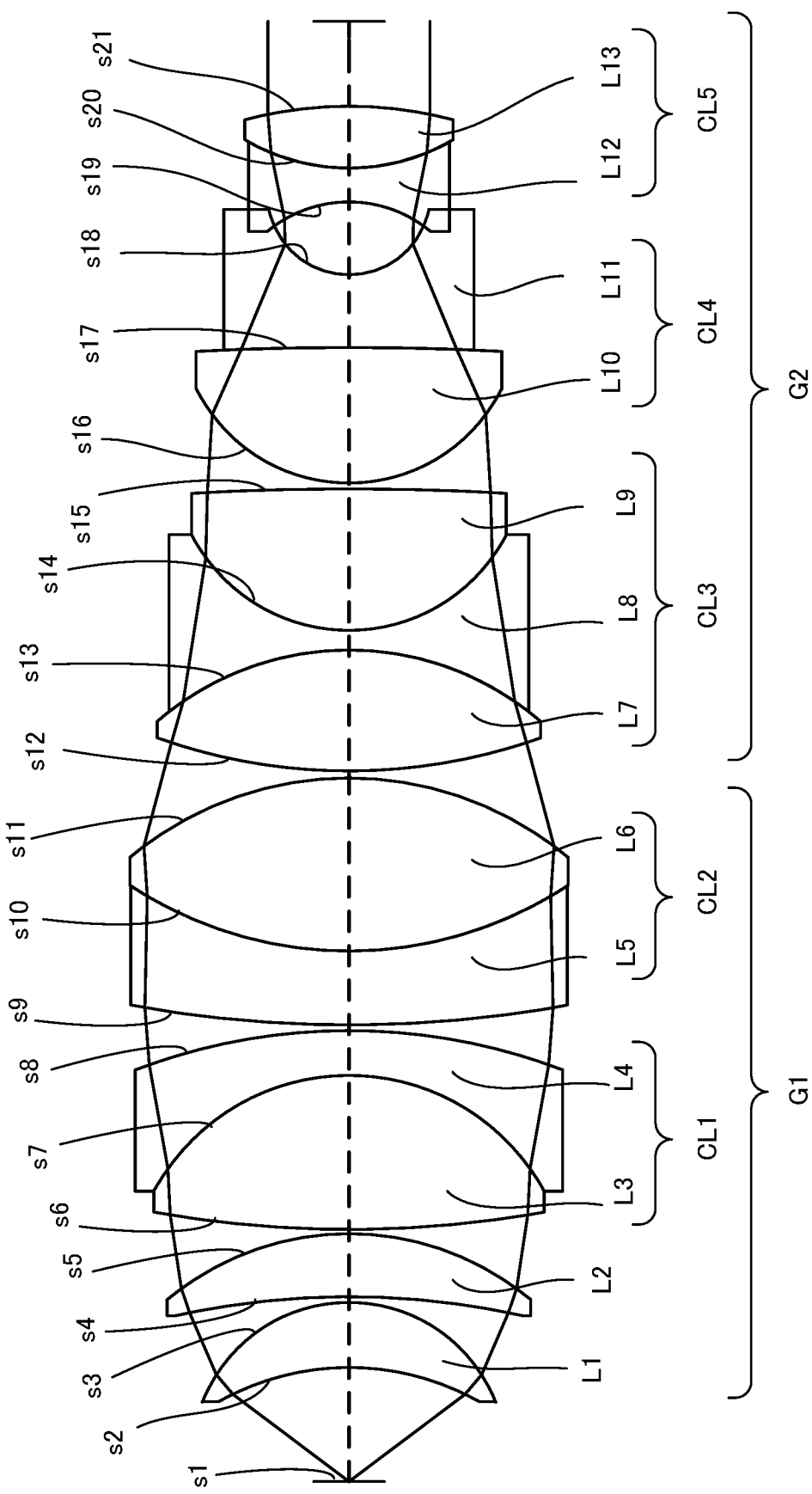
FIG. 4 is a cross-sectional view of an objective according to a second example of the present invention.

FIG. 4 is a cross-sectional view of an objective 2 according to the present example. The objective 2 is a microscope objective, and includes a first lens group G1 that has positive refractive power and converts divergent light from an object point to convergent light, and a second lens group G2 that has negative refractive power and is arranged closer to an image side than the first lens group G1.

The first lens group G1 includes, in order from the object side, a lens L1 that is a meniscus lens having positive refractive power with a concave surface facing the object side, a lens L2 that is a meniscus lens with a concave surface facing the object side, a cemented lens CL1, and a cemented lens CL2.

The cemented lens CL1 is a two-piece cemented lens and includes, in order from the object side, a lens L3 that is a biconvex lens and a lens L4 that is a meniscus lens with a concave surface facing the object side. The cemented lens CL2 is a two-piece cemented lens and includes, in order from the object side, a lens L5 that is a meniscus lens with a concave surface facing the image side and a lens L6 that is a biconvex lens.

The second lens group G2 includes, in order from the object side, a cemented lens CL3, a cemented lens CL4, and a cemented lens CL5. The cemented lens CL4 and the cemented lens CL5 are a pair of meniscus lens components whose concave surfaces face each other. The objective 2 includes three cemented lenses (cemented lens CL1, cemented lens CL2, and cemented lens CL3) situated closer to the object side than the pair of meniscus lens components.

The cemented lens CL3 is a three-piece cemented lens and includes, in order from the object side, a lens L7 that is a biconvex lens, a lens L8 that is a biconcave lens, and a lens L9 that is a biconvex lens. That is, the cemented lens CL3 is a positive-negative-positive three-piece cemented lens in which positive lenses (lens L7, lens L9) are arranged on both sides of one negative lens (lens L8).

The cemented lens CL4 is a two-piece cemented lens and includes, in order from the object side, a lens L10 that is a biconvex lens and a lens L11 that is a biconcave lens. The cemented lens CL5 is a two-piece cemented lens and includes, in order from the object side, a lens L12 that is a biconcave lens and a lens L13 that is a biconvex lens.

Various data of the objective 2 are as follows.
$NA_{ob}$=0.8, β=50, f=3.6 mm, f1=8.529 mm, f2=−17.839 mm, L=48.699 mm, d0=4.04 mm, $\varphi_{L1}$=9.9 mm, $D_{L1}$=2.306 mm, $R_{211}$=6.0577 mm, $R_{212}$=2.8933 mm, vdL=28.43, ndH=1.65412

Lens data of the objective 2 is as follows.

| Objective Lens 2 | | | | |
|---|---|---|---|---|
| s | r | d | nd | vd |
| 1 | INF | 4.040 | | |
| 2 | −9.4059 | 2.306 | 1.88300 | 40.76 |
| 3 | −5.5903 | 0.200 | | |
| 4 | −28.3283 | 2.230 | 1.56907 | 71.30 |
| 5 | −10.0330 | 0.150 | | |
| 6 | 39.2527 | 5.456 | 1.43875 | 94.66 |
| 7 | −7.8854 | 1.587 | 1.61340 | 44.27 |
| 8 | −21.2762 | 0.200 | | |
| 9 | 42.9739 | 2.616 | 1.65412 | 39.68 |
| 10 | 14.1151 | 6.128 | 1.43875 | 94.66 |
| 11 | −12.1339 | 0.250 | | |
| 12 | 20.2765 | 4.284 | 1.43875 | 94.66 |
| 13 | −10.3822 | 0.692 | 1.61340 | 44.27 |
| 14 | 6.2850 | 5.015 | 1.43875 | 94.66 |
| 15 | −93.6689 | 0.200 | | |
| 16 | 6.0577 | 4.804 | 1.56907 | 71.30 |
| 17 | −105.9012 | 2.570 | 1.65412 | 39.68 |
| 18 | 2.8933 | 2.585 | | |
| 19 | −4.5205 | 1.191 | 1.48749 | 70.23 |
| 20 | 7.2372 | 2.194 | 1.78880 | 28.43 |
| 21 | −14.3850 | 110.000 | | |

The objective 2 satisfies the conditional expressions (1) to (8) as described below.

$$\varphi_{L1}/D_{L1}=4.293 \tag{1}$$

$$|R_{212}|/f=0.804 \tag{2}$$

$$|R_{211}|/f=1.683 \tag{3}$$

$$vdL=28.430 \text{(lens } L13) \tag{4}$$

$$ndH=1.654 \text{(lens } L5, \text{lens } L11) \tag{5}$$

$$d0/L=0.083 \tag{6}$$

$$NA=0.80 \tag{7}$$

$$L=48.699 \text{ mm} \tag{8}$$

Figure 5:
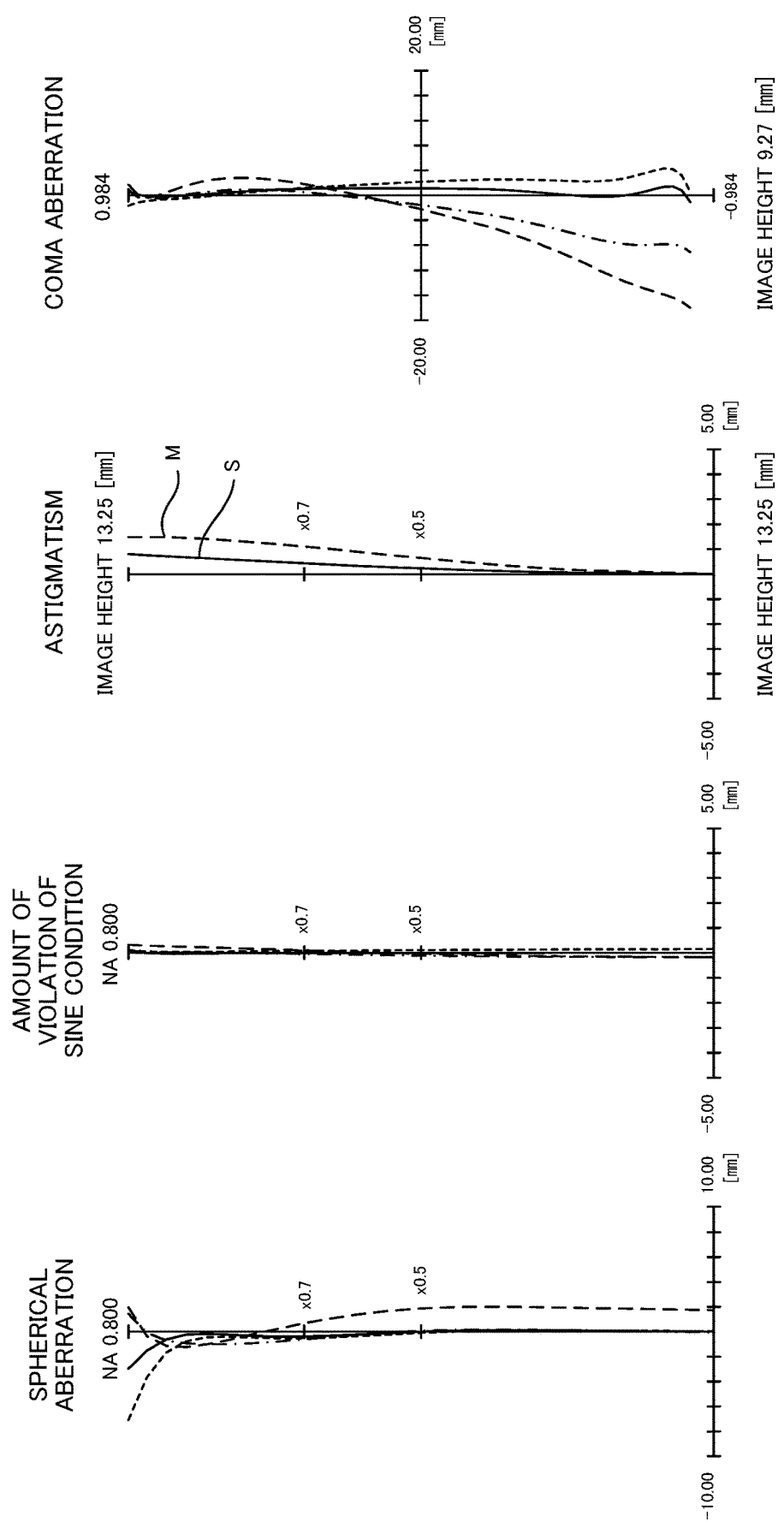
FIGS. 5A to 5D are diagrams of aberrations in an optical system including the objective and the tube lens.

FIGS. 5A to 5D are diagrams of aberrations in an optical system including the objective 2 and the tube lens 10, and illustrate aberrations on an image plane on which the objective 2 and the tube lens 10 form an optical image. FIG. 5A is a diagram of a spherical aberration. FIG. 5B is a diagram illustrating an amount of violation of the sine condition. FIG. 5C is a diagram of astigmatism. FIG. 5D is a diagram of a coma aberration at the level of 70% of an image height ratio (image height of 9.27 mm). As illustrated in FIGS. 5A to 5D, in the present embodiment, the aberrations are favorably corrected in a wide field of view.

Third Example

Figure 6:
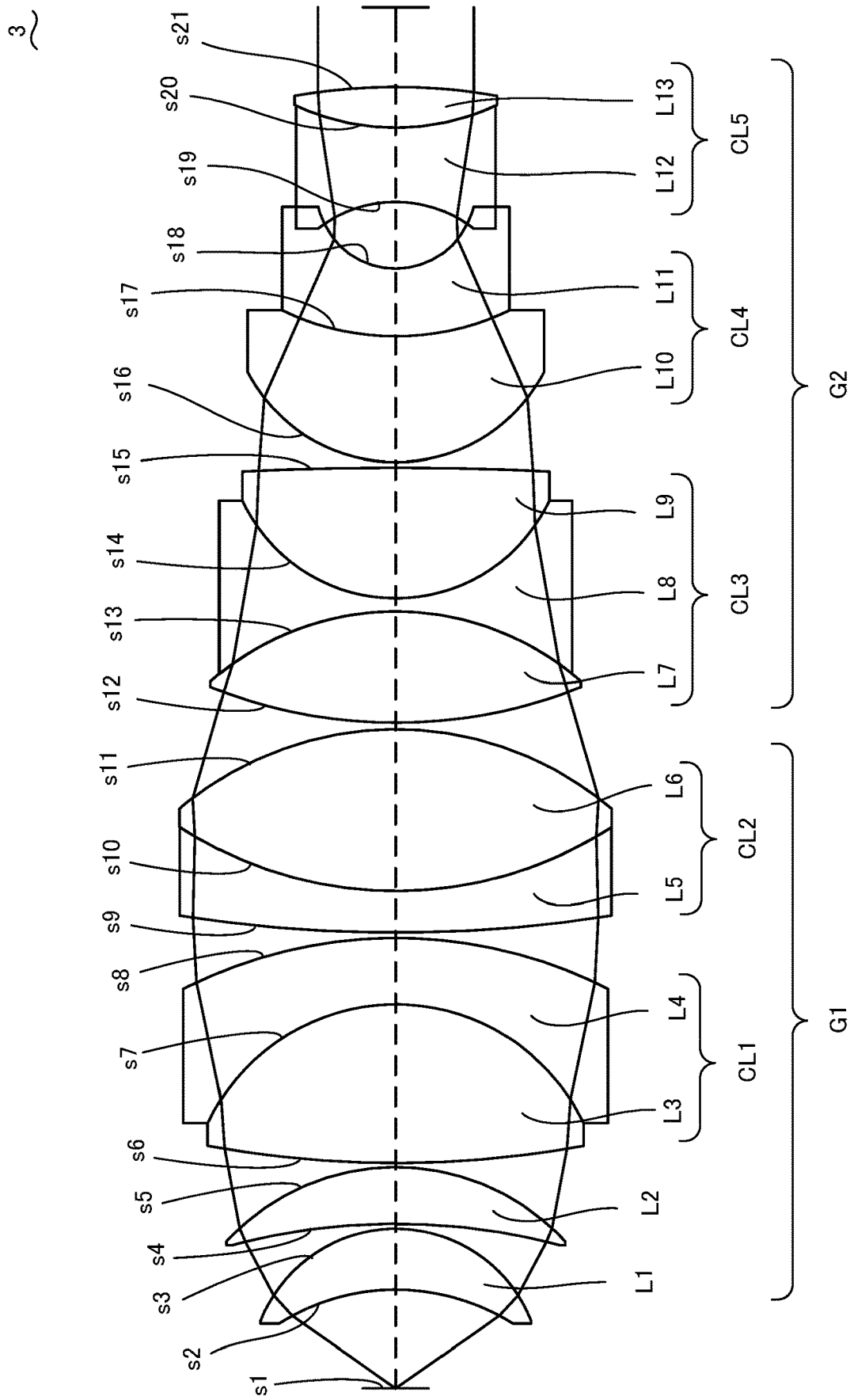
FIG. 6 is a cross-sectional view of an objective according to a third example of the present invention.

FIG. 6 is a cross-sectional view of an objective 3 according to the present example. The objective 3 is a microscope objective, and includes a first lens group G1 that has positive refractive power and converts divergent light from an object point to convergent light, and a second lens group G2 that has negative refractive power and is arranged closer to an image side than the first lens group G1.

The first lens group G1 includes, in order from the object side, a lens L1 that is a meniscus lens having positive refractive power with a concave surface facing the object side, a lens L2 that is a meniscus lens with a concave surface facing the object side, a cemented lens CL1, and a cemented lens CL2.

The cemented lens CL1 is a two-piece cemented lens and includes, in order from the object side, a lens L3 that is a biconvex lens and a lens L4 that is a meniscus lens with a concave surface facing the object side. The cemented lens CL2 is a two-piece cemented lens and includes, in order from the object side, a lens L5 that is a meniscus lens with a concave surface facing the image side and a lens L6 that is a biconvex lens.

The second lens group G2 includes, in order from the object side, a cemented lens CL3, a cemented lens CL4, and a cemented lens CL5. The cemented lens CL4 and the cemented lens CL5 are a pair of meniscus lens components whose concave surfaces face each other. The objective 3 includes three cemented lenses (cemented lens CL1, cemented lens CL2, and cemented lens CL3) situated closer to the object side than the pair of meniscus lens components.

The cemented lens CL3 is a three-piece cemented lens and includes, in order from the object side, a lens L7 that is a biconvex lens, a lens L8 that is a biconcave lens, and a lens L9 that is a biconvex lens. That is, the cemented lens CL3 is a positive-negative-positive three-piece cemented lens in which positive lenses (lens L7, lens L9) are arranged on both sides of one negative lens (lens L8).

The cemented lens CL4 is a two-piece cemented lens and includes, in order from the object side, a lens L10 that is a meniscus lens with a concave surface facing the image side and a lens L11 that is a meniscus lens with a concave surface facing the image side. The cemented lens CL5 is a two-piece cemented lens and includes, in order from the object side, a lens L12 that is a biconcave lens and a lens L13 that is a biconvex lens.

Various data of the objective 3 are as follows.

$NA_{ob}$=0.82, $\beta$=50, f=3.6 mm, f1=8.643 mm, f2=−17.573 mm, L=49.299 mm, d0=3.733 mm, $\varphi_{L1}$=9.76 mm, $D_{L1}$=2.306 mm, $R_{211}$=6.337 mm, $R_{212}$=3.0206 mm, vdL=29.84, ndH=1.65412

Lens data of the objective 3 is as follows.

| Objective Lens 3 | | | | |
|---|---|---|---|---|
| s | r | d | nd | vd |
| 1 | INF | 3.733 | | |
| 2 | −8.2556 | 2.306 | 1.88300 | 40.76 |
| 3 | −5.5117 | 0.200 | | |
| 4 | −23.7453 | 2.143 | 1.56907 | 71.30 |
| 5 | −8.7229 | 0.150 | | |
| 6 | 38.6247 | 6.006 | 1.43875 | 94.66 |
| 7 | −7.8819 | 2.525 | 1.61340 | 44.27 |
| 8 | −17.7012 | 0.200 | | |
| 9 | 52.3455 | 1.560 | 1.65412 | 39.68 |
| 10 | 15.0020 | 6.140 | 1.43875 | 94.66 |
| 11 | −12.6408 | 0.250 | | |
| 12 | 18.8709 | 4.205 | 1.43875 | 94.66 |
| 13 | −10.6324 | 0.500 | 1.61340 | 44.27 |
| 14 | 6.4238 | 4.954 | 1.43875 | 94.66 |
| 15 | −117.9018 | 0.200 | | |
| 16 | 6.3370 | 4.768 | 1.56907 | 71.30 |
| 17 | 9.8501 | 2.570 | 1.65412 | 39.68 |
| 18 | 3.0206 | 2.522 | | |
| 19 | −4.7575 | 2.814 | 1.48749 | 70.23 |
| 20 | 8.9801 | 1.552 | 1.80000 | 29.84 |
| 21 | −21.1397 | 110.000 | | |

The objective 3 satisfies the conditional expressions (1) to (8) as described below.

$$\varphi_{L1}/D_{L1}=4.232 \tag{1}$$

$$|R_{212}|/f=0.839 \tag{2}$$

$$|R_{212}|/f=1.760 \tag{3}$$

$$vdL=29.840 (\text{lens } L13) \tag{4}$$

$$ndH=1.654 (\text{lens } L5, \text{lens } L11) \tag{5}$$

$$d0/L=0.076 \tag{6}$$

$$NA=0.82 \tag{7}$$

$$L=49.299 \text{ mm} \tag{8}$$

Figure 7:
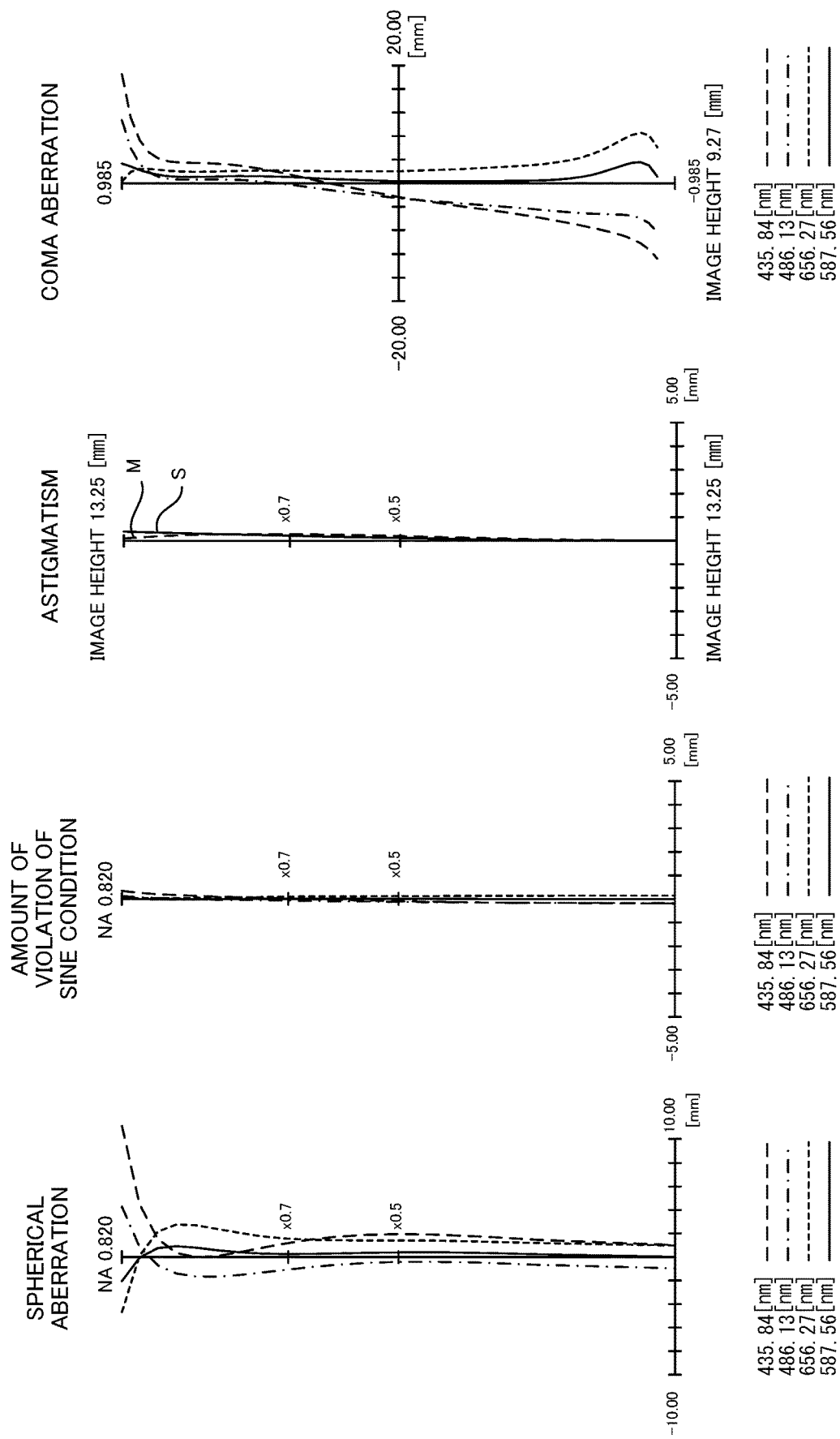
FIGS. 7A to 7D are diagrams of aberrations in an optical system including the objective and the tube lens.

FIGS. 7A to 7D are diagrams of aberrations in an optical system including the objective 3 and the tube lens 10, and illustrate aberrations on an image plane on which the objective 3 and the tube lens 10 form an optical image. FIG. 7A is a diagram of a spherical aberration. FIG. 7B is a diagram illustrating an amount of violation of the sine condition. FIG. 7C is a diagram of astigmatism. FIG. 7D is a diagram of a coma aberration at the level of 70% of an image height ratio (image height of 9.27 mm). As illustrated in FIGS. 7A to 7D, in the present embodiment, the aberrations are favorably corrected in a wide field of view.

Fourth Example

Figure 8:
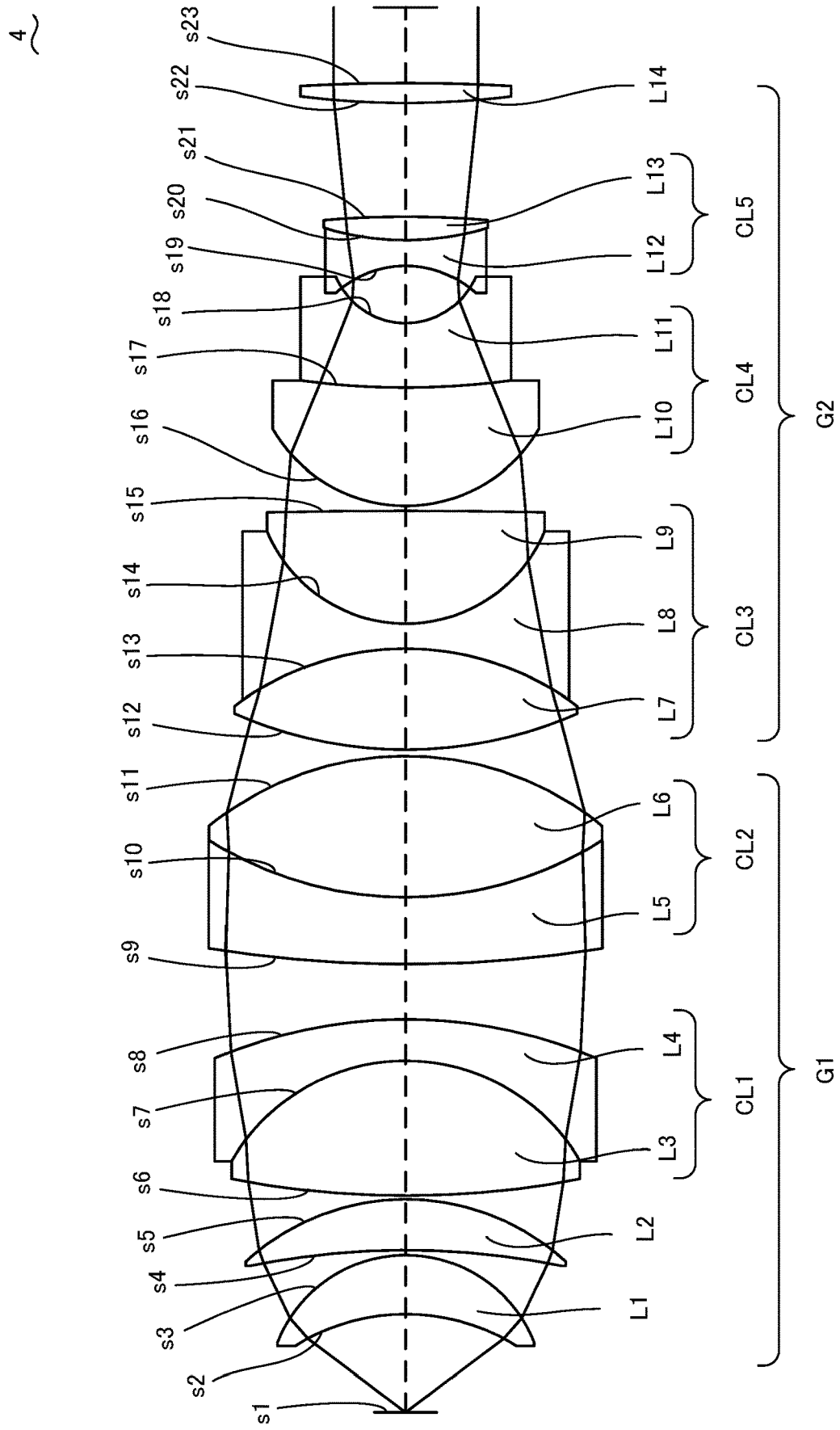
FIG. 8 is a cross-sectional view of an objective according to a fourth example of the present invention.

FIG. 8 is a cross-sectional view of an objective 4 according to the present example. The objective 4 is a microscope objective, and includes a first lens group G1 that has positive refractive power and converts divergent light from an object point to convergent light, and a second lens group G2 that has negative refractive power and is arranged closer to an image side than the first lens group G1.

The first lens group G1 includes, in order from the object side, a lens L1 that is a meniscus lens having positive refractive power with a concave surface facing the object side, a lens L2 that is a meniscus lens with a concave surface facing the object side, a cemented lens CL1, and a cemented lens CL2.

The cemented lens CL1 is a two-piece cemented lens and includes, in order from the object side, a lens L3 that is a biconvex lens and a lens L4 that is a meniscus lens with a concave surface facing the object side. The cemented lens CL2 is a two-piece cemented lens and includes, in order from the object side, a lens L5 that is a meniscus lens with a concave surface facing the image side and a lens L6 that is a biconvex lens.

The second lens group G2 includes, in order from the object side, a cemented lens CL3, a cemented lens CL4, a cemented lens CL5, and a lens L14 that is a biconvex lens. The cemented lens CL4 and the cemented lens CL5 are a pair of meniscus lens components whose concave surfaces face each other. The objective 4 includes three cemented lenses (cemented lens CL1, cemented lens CL2, and cemented lens CL3) situated closer to the object side than the pair of meniscus lens components.

The cemented lens CL3 is a three-piece cemented lens and includes, in order from the object side, a lens L7 that is a biconvex lens, a lens L8 that is a biconcave lens, and a lens L9 that is a biconvex lens. That is, the cemented lens CL3 is a positive-negative-positive three-piece cemented lens in which positive lenses (lens L7, lens L9) are arranged on both sides of one negative lens (lens L8).

The cemented lens CL4 is a two-piece cemented lens and includes, in order from the object side, a lens L10 that is a meniscus lens with a concave surface facing the image side and a lens L11 that is a meniscus lens with a concave surface facing the image side. The cemented lens CL5 is a two-piece cemented lens and includes, in order from the object side, a lens L12 that is a biconcave lens and a lens L13 that is a biconvex lens.

Various data of the objective 4 are as follows.

$NA_{ob}$=0.8, β=50, f=3.6 mm, f1=8.824 mm, f2=−17.901 mm, L=53.001 mm, d0=3.905 mm, $\varphi_{L1}$=9.74 mm, $D_{L1}$=2.359 mm, $R_{211}$=6.1484 mm, $R_{212}$=3.0222 mm, vdL=25.42, ndH=1.673

Lens data of the objective 4 is as follows.

| Objective Lens 4 | | | | |
|---|---|---|---|---|
| s | r | d | nd | vd |
| 1 | INF | 3.906 | | |
| 2 | −8.3496 | 2.359 | 1.88300 | 40.76 |
| 3 | −5.5048 | 0.200 | | |
| 4 | −30.7266 | 2.031 | 1.56907 | 71.30 |
| 5 | −9.4401 | 0.150 | | |
| 6 | 37.1063 | 5.361 | 1.43875 | 94.66 |
| 7 | −8.0669 | 1.659 | 1.61340 | 44.27 |
| 8 | −19.4171 | 2.208 | | |
| 9 | 49.6209 | 2.651 | 1.67300 | 38.26 |
| 10 | 14.6608 | 5.647 | 1.43875 | 94.66 |
| 11 | −12.3950 | 0.250 | | |
| 12 | 16.9791 | 4.017 | 1.43875 | 94.66 |
| 13 | −11.4067 | 1.000 | 1.61340 | 44.27 |
| 14 | 6.0053 | 4.506 | 1.43875 | 94.66 |
| 15 | −241.4394 | 0.200 | | |
| 16 | 6.1484 | 4.711 | 1.56907 | 71.30 |
| 17 | 31.8644 | 2.570 | 1.65412 | 39.68 |
| 18 | 3.0222 | 2.290 | | |
| 19 | −4.1357 | 1.000 | 1.48749 | 70.23 |
| 20 | 10.8194 | 0.941 | 1.76182 | 26.52 |
| 21 | −39.7297 | 4.548 | | |
| 22 | 33.3089 | 0.796 | 1.80518 | 25.42 |
| 23 | −73.8152 | 110.000 | | |

The objective 4 satisfies the conditional expressions (1) to (8) as described below.

$\varphi_{L1}/DL_1$=4.129 (1)

$|R_{212}|/f$=0.840 (2)

$|R_{211}|/f$=1.708 (3)

vdL=25.420(lens L14) (4)

ndH=1.673(lens L5) (5)

d0/L=0.074 (6)

NA=0.80 (7)

L=53.001 mm (8)

FIGS. 9A to 9D are diagrams of aberrations in an optical system including the objective 4 and the tube lens 10, and illustrate aberrations on an image plane on which the objective 4 and the tube lens 10 form an optical image. FIG. 9A is a diagram of a spherical aberration. FIG. 9B is a diagram illustrating an amount of violation of the sine condition. FIG. 9C is a diagram of astigmatism. FIG. 9D is a diagram of a coma aberration at the level of 70% of an image height ratio (image height of 9.27 mm). As illustrated in FIGS. 9A to 9D, in the present embodiment, the aberrations are favorably corrected in a wide field of view.

What is claimed is:

1. An objective comprising:
a first lens group that has positive refractive power and converts divergent light from an object point to convergent light; and
a second lens group that has negative refractive power and is arranged closer to an image side than the first lens group,
wherein the first lens group includes a first lens that is a meniscus lens that is situated closest to an object side and has positive refractive power with a concave surface facing the object side,
the second lens group includes a pair of meniscus lens components having concave surfaces facing each other,
the objective includes three or more cemented lenses that are arranged closer to the object side than the pair of meniscus lens components, and
conditional expressions $2.6 \leq \varphi_{L1}/D_{L1} \leq 16$ (1)

$0.1 \leq |R_{212}|/f \leq 3.5$ (2)

are satisfied, where $\varphi_{L1}$ is an outer diameter of the first lens, $D_{L1}$ is a thickness of the first lens on an optical axis, $R_{212}$ is a radius of curvature of a surface closest to the image side in a first meniscus lens component, the first meniscus lens component being a meniscus lens component situated on the object side among the pair of meniscus lens components, and f is a focal length of the objective.

2. The objective according to claim 1, wherein the second lens group includes a positive-negative-positive three-piece cemented lens in which positive lenses are arranged on both sides of one negative lens.

3. The objective according to claim 2, wherein a conditional expression $0.5 \leq |R_{211}|/f \leq 7$ (3)

is satisfied, where $R_{211}$ is a radius of curvature of a surface that is situated closest to the object side in the first meniscus lens component.

4. The objective according to claim 3, wherein each of the pair of meniscus lens components is a cemented lens.

5. The objective according to claim 4, wherein a conditional expression $18 \leq vdL \leq 31$ (4)

is satisfied, where vdL is a minimum value of Abbe numbers of positive lenses arranged closer to the image side than a surface that is situated closest to the image side in the first meniscus lens component.

6. The objective according to claim 1, wherein a conditional expression $$0.5 \leq |R_{211}|/f \leq 7 \quad (3)$$

is satisfied, where $R_{211}$ is a radius of curvature of a surface that is situated closest to the object side in the first meniscus lens component.

7. The objective according to claim 1, wherein each of the pair of meniscus lens components is a cemented lens.

8. The objective according to claim 1, wherein a conditional expression $$18 \leq vdL \leq 31 \quad (4)$$

is satisfied, where vdL is a minimum value of Abbe numbers of positive lenses arranged closer to the image side than a surface that is situated closest to the image side in the first meniscus lens component.

9. The objective according to claim 1, wherein a conditional expression $$1.51 \leq ndH \leq 1.75 \quad (5)$$

is satisfied, where ndH is a maximum value of refractive indices of negative lenses included in the objective.

10. The objective according to claim 2, wherein each of the pair of meniscus lens components is a cemented lens.

11. The objective according to claim 2, wherein a conditional expression $$18 \leq vdL \leq 31 \quad (4)$$

is satisfied, where vdL is a minimum value of Abbe numbers of positive lenses arranged closer to the image side than a surface that is situated closest to the image side in the first meniscus lens component.

12. The objective according to claim 2, wherein a conditional expression $$1.51 \leq ndH \leq 1.75 \quad (5)$$

is satisfied, where ndH is a maximum value of refractive indices of negative lenses included in the objective.

13. The objective according to claim 3, wherein a conditional expression $$18 \leq vdL \leq 31 \quad (4)$$

is satisfied, where vdL is a minimum value of Abbe numbers of positive lenses arranged closer to the image side than a surface that is situated closest to the image side in the first meniscus lens component.

14. The objective according to claim 2, wherein a conditional expression $$1.51 \leq ndH \leq 1.75 \quad (5)$$

is satisfied, where ndH is a maximum value of refractive indices of negative lenses included in the objective.

\* \* \* \* \*